United States Patent

[11] 3,566,141

| [72] | Inventor | Arthur J. Moser<br>Los Angeles, Calif. (10751 Chandler Blvd., North Hollywood, Calif. 91601) |
|---|---|---|
| [21] | Appl. No. | 798,994 |
| [22] | Filed | Feb. 13, 1969 |
| [45] | Patented | Feb. 23, 1971 |

[54] LIGHT CONTROLLED ATTENUATOR
18 Claims, 17 Drawing Figs.

[52] U.S. Cl................................................. 250/233,
250/239, 330/59
[51] Int. Cl..................................................... G01d 5/36
[50] Field of Search........................................... 250/211
(R), 213 (A), 233, 237, 239, 209, 216; 330/59

[56] References Cited
UNITED STATES PATENTS

| 2,604,528 | 7/1952 | Obermaier ................... | 250/233X |
| 3,098,152 | 7/1963 | Von Mathes ................. | 250/233X |
| 3,104,351 | 9/1963 | Rosenberg.................... | 250/209X |
| 3,419,727 | 12/1968 | Pabst........................... | 250/233X |

Primary Examiner—James W. Lawrence
Assistant Examiner—C. M. Leedom
Attorney—Allan M. Shapiro ABSTRACT: A light-controlled attenuator comprises a pair of photosensitive resistance cells mounted facing each other, a pair of spaced parallel optical shutters disposed between the cells, and a single light source situated between the shutters so as to illuminate each cell through a portion of its respective shutter. Each shutter may be opaque except for a transparent aperture of controlled dimensions, or may otherwise vary in optical transmissivity as a function of position on the shutter surface. Means are provided to change simultaneously the portion of the shutters interposed in the light paths to the two cells, the aperture width or density of the interposed shutter portion determining the effective resistance of each cell.

PATENTED FEB 23 1971

INVENTOR.
ARTHUR J. MOSER
BY A. M. Shapiro
ATTORNEY

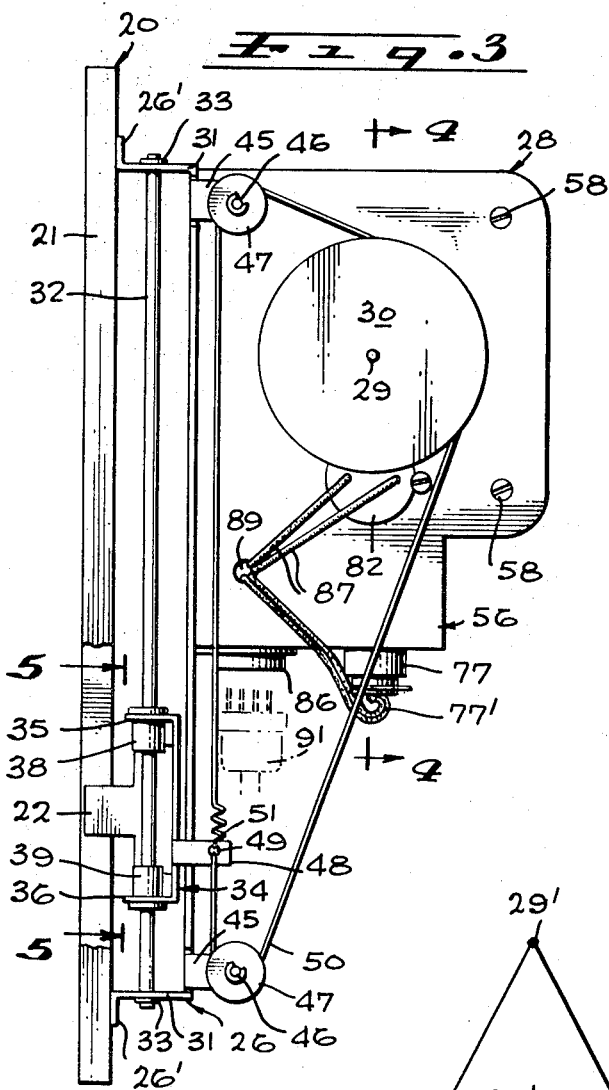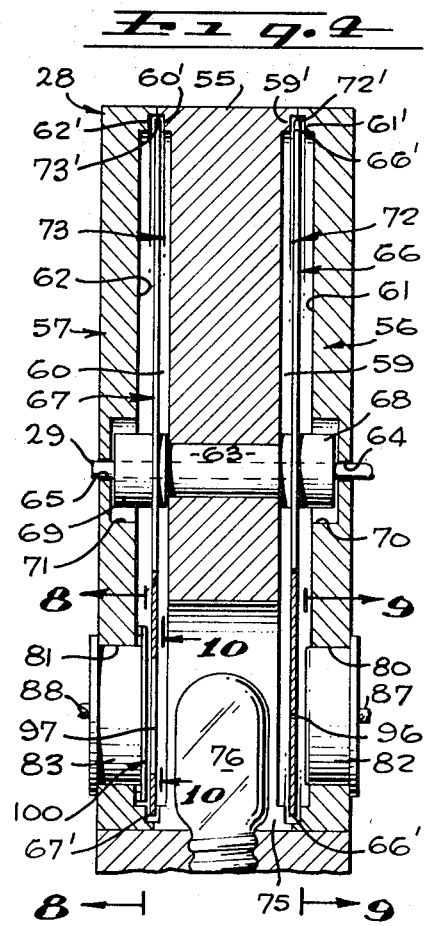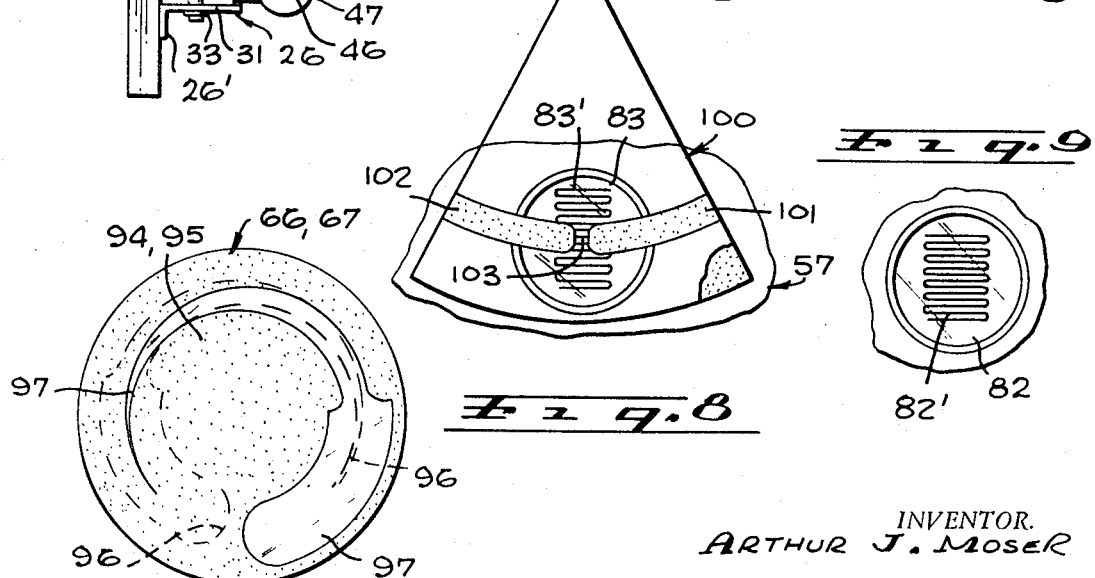

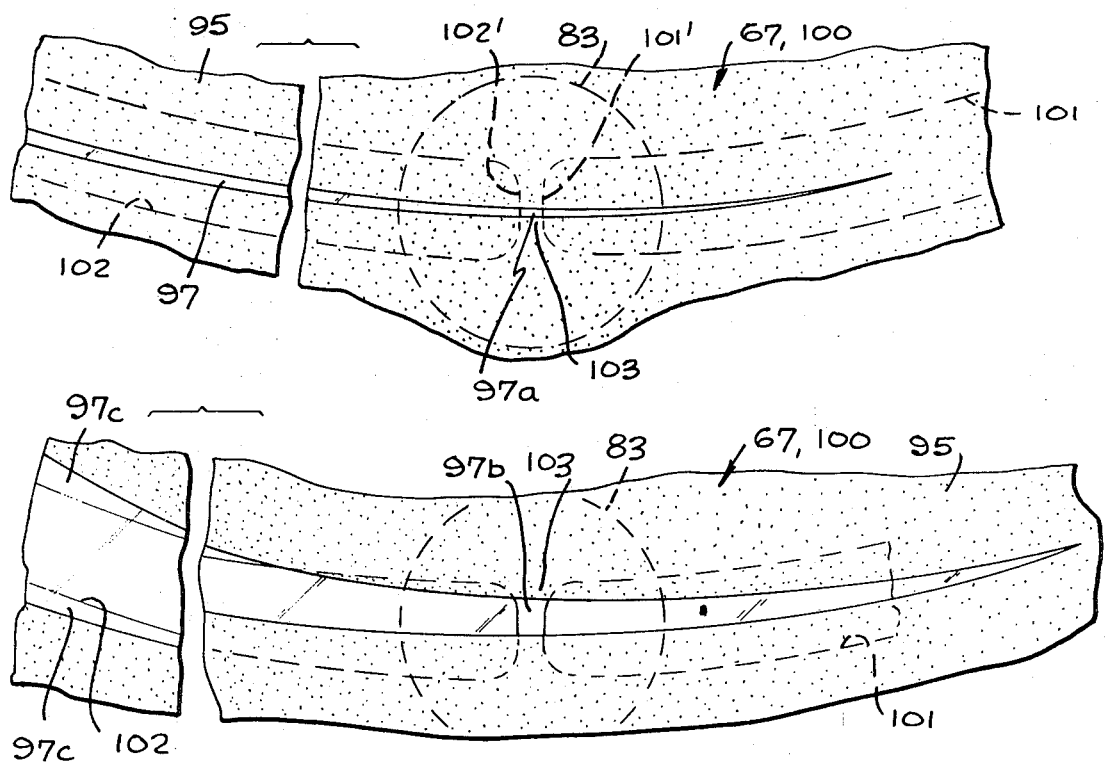
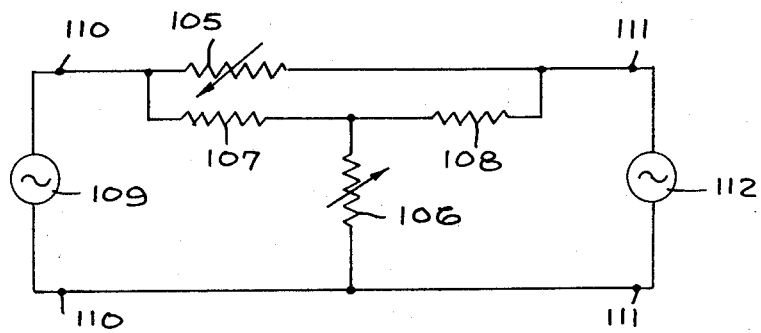

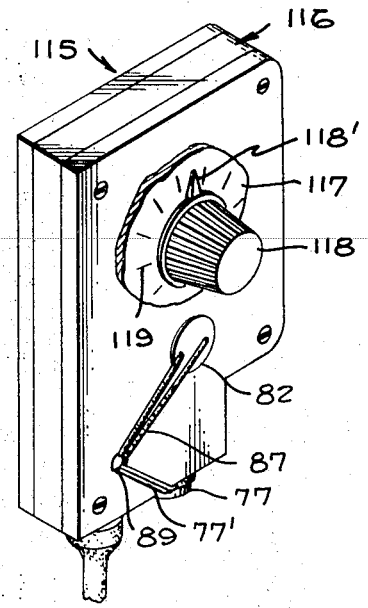
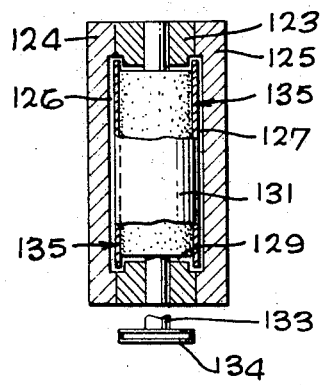
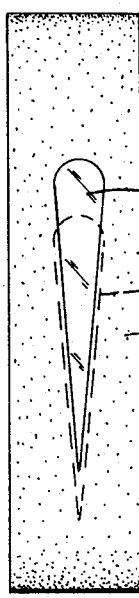
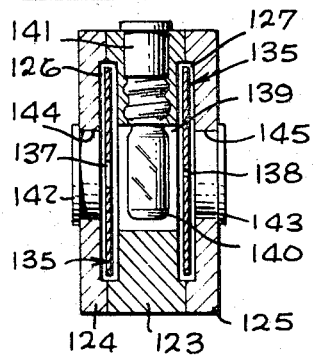
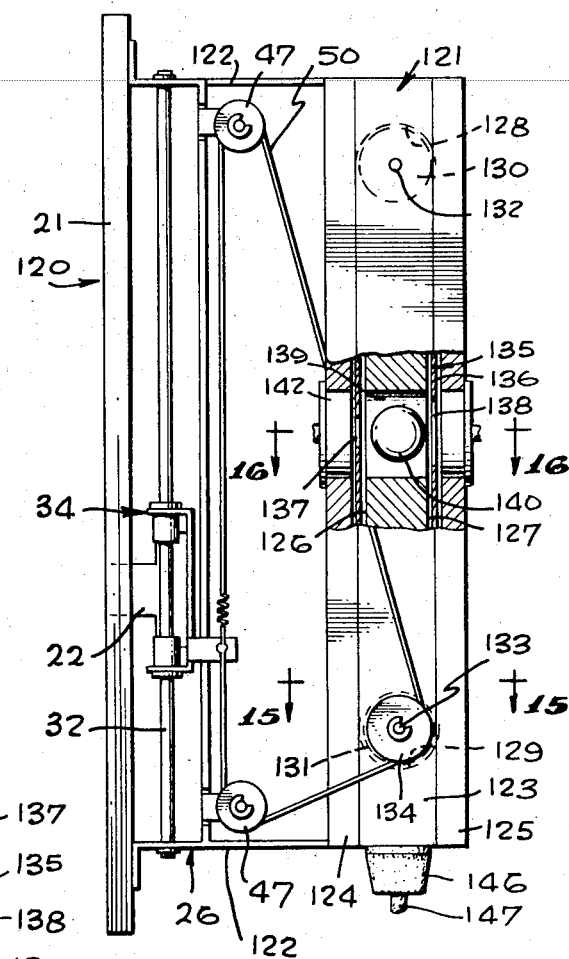

LIGHT CONTROLLED ATTENUATOR

BACKGROUND OF THE INVENTION

1. Field of the Invention

The present invention relates to an optically controlled attenuator and, more particularly, to an attenuator wherein the resistive elements comprise photosensitive resistance cells illuminated by the same light source through shutters of controlled aperture width or optical transmissivity.

2. Description of the Prior Art

Providing distortion-free, low noise, amplitude level control for high quality audio circuits has posed serious problems to audio design engineers. Many of these problems are exemplified by the wire wound or thin film potentiometer often used as an inexpensive volume control. While such a potentiometer can provide signal attenuation, distortion of the signal results from variation in terminal impedance as the level is changed. Moreover, when used to control low level signals, the noise generated as the potentiometer contact slides over the wound wire or thin film resistance element becomes particularly objectionable.

To overcome the variable impedance problem, level control in most high performance audio equipment is achieved by utilizing an attenuator circuit which provides constant terminal impedance. Typically, unbalanced or balanced ladder, T, H or L circuits have been used for this purpose. These circuits have the common feature that two or more resistances must be varied simultaneously, possibly in nonlinear relation to one another, to provide the desired attenuation with constant terminal impedance.

In the past, construction of such attenuators has presented several problems. The approach of using a pair of ganged wire wound or thin film potentiometers is inexpensive but undesirable because of the slider noise generation problem. Further, it is difficult to fabricate such potentiometers with nonlinear resistance characteristics.

Another prior art approach has been to employ ladder-type attenuators wherein a plurality of fixed resistances are mounted in a single housing and are connected to a multiplicity of contacts. A rotary switch, often employing heavy-duty silver alloy contacts and multileaf switchblades, is used to switch appropriate sets of these resistors into the circuit. Such attenuator switches are expensive since sufficient steps of attenuation and, hence, step contacts must be provided so that the change from one set of resistances to the next will not be discernible. Typically, a change in signal level of 1 db. is almost imperceptible to the human ear; a change of 1½db. may be detected but is not noticeable. As a general rule, the sound industry regards 30 steps of 1½db. each as the standard for high quality rotary mixers. Even in less expensive attenuators having steps of 2 db., some 20 sets of contacts are required, hence the units still are both complicated and expensive.

A far more satisfactory approach to providing an attenuator not exhibiting noise associated with mechanically variable resistors, and not requiring multicontact switches, is to utilize photosensitive resistance cells as the resistive elements. By varying the amount of light incident on each cells, the resistance of the cell is changed proportionally with no concomitant generation of noise. The cell resistance then may be utilized in an attenuator circuit having constant terminal impedance, the desired nonlinear resistance characteristics being achieved by appropriately varying the incident light level.

Typical prior art light-controlled attenuators have employed a single photosensitive resistance cell illuminated by a light bulb, the brightness of which is adjusted by varying the voltage supplied to the bulb. While such devices do not introduce noise into the signal being attenuated, they do have various shortcomings. Thus, if a nonlinear relationship between control knob position and effective cell resistance is desired, it is necessary to use a nonlinear potentiometer to control the lamp voltage. Moreover, the fact that the brightness of a lamp is not a linear function of the applied voltage adds to the complexity of the nonlinear potentiometer required to control the lamp voltage. Then too, the difficulty of providing appropriate physical spread of the potentiometer resistance element limits the precision with which the light output and, hence, the cell resistance can be controlled.

A more satisfactory approach in the prior art is suggested in U.S. Pat. No. 3,358,150. There, two lamps respectively illuminate a pair of photosensitive resistance cells. Portions of a single, partially transparent, rotatable circular disc, having a substantially cardiodal waveform impressed thereon, are interposed in the light paths from the lamps to the cells. Rotation of the disc causes simultaneous but inverse changes in the light levels read reaching the cells from their respective light sources.

The foregoing apparatus largely eliminated the problems associated with nonlinear control of the voltage to the light source. However, the device employs a pair of lamps, with the concomitant disadvantage that, with time, the light level from the two lamps tends to degrade nonuniformly. Moreover, since a single shutter disc is used to control the light level incident on both cells, it is impossible to provide a pattern on the disc which will permit independent nonlinear control of each cell with a shaft rotation of more 180°. If different shutter patterns were provided on each half of the disc and the shaft rotated more than 180°, the pattern for the first cell would be interposed in the light path to the second cell, causing the latter cell to exhibit undesired resistance values.

Another approach of the prior art is set forth in U.S. Pat. No. 3,363,106. There, an electric organ swell control utilizes a single curved shutter element having a suitably shaped aperture interposed in the light paths between a single lamp and two spaced cells. A foot control rotates the shutter element in such a way as to cause the light level impinging on one cell to vary inversely with the change in light level to the other cell. While such an arrangement largely eliminates the problems inherent in using a pair of light sources, the requirement of having different portions of the same shutter interposed in the light paths to separate cells remains a serious problem, and prevents independent, nonlinear control of the two cells.

These and other shortcomings of the prior art are overcome by the present inventive light-controlled attenuator wherein a pair of photosensitive resistance cells are illuminated by the same light source, and wherein separate shutters, operated by the same control mechanism, are situated in the light paths to each cell. The inventive attenuator facilitates precise, independent, linear or nonlinear control of the resistances of the two cells, thereby providing a noise-free attenuator useful in high quality audio circuits and the like.

SUMMARY OF THE INVENTION

In accordance with the present invention, there is provided a light-controlled attenuator comprising a pair of photosensitive resistance cells mounted facing each other, on opposite sides of a single light source. A pair of shutters are disposed respectively in the light paths to the two cells. The shutters each comprise an opaque sheet having an elongate, transparent aperture of variable width, or having a variable optical density pattern thereon. The aperture or density pattern is selected to produce the desired nonlinear resistance characteristic from the respective cell as a function of displacement of the shutter.

In a first embodiment, the shutters each are disc-shaped and incorporate a generally circular aperture pattern, which may extend around considerably more than 300° of the disc. A lighttight housing is provided wherein the single light source is recessed in a central section, the two disc-shaped shutters are located in lighttight chambers on either side of the light source, and the two photosensitive resistance cells are situated in respective sidewalls of the housing, facing the light source. Rotation of the common shaft to which the shutters are attached causes different portions of the apertures to be interposed in the light paths to the photosensitive cells, causing concomitant change in their resistance. The aperture patterns on the two shutters are independent of each other and may be of completely different configuration.

Shutter rotation may be controlled directly by a knob connected to the shaft. In another inventive embodiment, the housing is attached by a bracket to an elongate escutcheon provided with a slidable knob. A cable and pulley system connects the knob to the shaft so that linear motion of the knob along the escutcheon causes the rotary displacement of the shutters. This embodiment is particularly desirable for applications where a large number of attenuators must be used, since the attenuators can be placed in close proximity to one another and permits a large number of such attenuators to be situated within arm's reach of an engineer using the equipment.

In another inventive embodiment, the optical shutters are provided on opposite sides of an endless belt mounted on rollers within a lighttight housing. The single light source is mounted between the sides of the shutter belt, the two photosensitive resistance cells being mounted on opposite sides of the belt. A vertical slider knob, pulley and cable system is used to effectuate displacement of the shutter belt, causing concomitant linear or nonlinear variation in the resistance of the cells.

To improve the resolution and precision of the attenuator, particularly in shutter aperture regions of narrow width, an additional filter or mad mask may be placed in the light path to one or both of the photosensitive cells. This mask incorporates a pair of fingerlike opaque sections having a narrow transparent region therebetween. This transparent region is centered on the photocell so that only light passing through both the shutter aperture and this narrow transparent region strikes the cell.

Thus, it is an object of the present invention to provide a noise-free light-controlled attenuator.

Another object of the present invention is to provide a light-controlled attenuator incorporating a single light source, a pair of photosensitive resistance cells, and a pair of shutters respectively interposed in the light paths between the light source and the two cells.

It is another object of the present invention to provide a light-controlled device permitting simultaneous but independent linear or nonlinear control of the resistances of a pair of photosensitive resistance cells illuminates by a single light source.

Yet another object of the present invention is to provide a light-controlled attenuator incorporating opaque shutters having a transparent aperture therein, the width of the aperture portion being interposed in a light path between a light source and a photocell for determining the resistance of that cell.

It is yet another object of the present invention to provide a light-controlled attenuator incorporating a pair of disc-shaped, photographically defined optical shutters interposed respectively in the light paths from a single light source to a pair of photosensitive resistance cells.

Still another object of the present invention is to provide a light-controlled attenuator of the type incorporating an apertured shutter interposed in the light path to a photosensitive resistance cell and further incorporating a filter narrowly defining the portion of the aperture controlling the light level incident on the cell.

A further object of the present invention is to provide a light-controlled attenuator incorporating disc-shaped optical shutters independently associated with respective photosensitive resistance cells, and incorporating a linear slide-type control for displacing the shutters.

Still a further object of the present invention is to provide a light-controlled attenuator incorporating a pair of optical shutters formed on opposite sides of an endless belt, a single light source situated in the center of the belt and a pair of photosensitive resistance cells disposed on opposite sides of the belt so that the light level incident on each of the cells is independently controlled by the pattern on the corresponding side of the belt.

Still other objects, features and attendant advantages of the present invention, together with various modifications, will become apparent to those skilled in the art from a reading of the following detailed description of the preferred embodiment constructed in accordance with therewith, taken in conjunction with the accompanying drawings wherein like numb numerals designate like parts in the several FIGS.

BRIEF DESCRIPTION OF THE DRAWINGS

FIG. 3 is an enlarged side elevational view of the light-controlled attenuator of FIG. 1.

FIG. 4 is a fragmentary enlarged sectional view of the assembled housing, illustrating the light source, shutters and photosensitive resistance cells, as seen generally along the line 4—4 of FIG. 3.

FIG. 7 is a plan view of the shutters utilized in the light-controlled attenuator of FIGS. 1—4, the shutters being shown superimposed on one another in their relative dispositions but disembodied from their associated elements.

FIG. 8 is a fragmentary elevational view, partially in section, taken generally along the line 8—8 of FIG. 4 and showing the mask used to limit the area of the photosensitive resistance cell exposed to light passing through the shutter aperture.

FIG. 9 is a fragmentary elevational view of one of the photosensitive resistance cells employed in the inventive light-controlled attenuator, as seen generally along the line 9—9 of FIG. 4.

FIG. 10 is a fragmentary enlarged elevational view taken generally along the line 10—10 of FIG. 4, showing a portion of one of the shutters, the mask and one of the photosensitive resistance cells employed in the attenuator.

FIG. 11 is a view similar to FIG. 10, with the shutter oriented at a different angular position.

FIG. 12 is a simplified electrical schematic diagram of a typical level control circuit employing the inventive light-controlled attenuator.

FIG. 13 is a perspective view of another embodiment of the inventive light-controlled attenuator utilizing a rotatable knob to control shutter position.

FIG. 14 is a side elevational view, partly broken away and in section, of yet another embodiment of the inventive light-controlled attenuator wherein a pair of optical shutters are included on different portions of a single endless belt, with the previously illustrated vertical slider mechanism being shown for operating the shutters.

FIG. 15 is a sectional view of a portion of the attenuator housing components for driving the shutter belt incorporated in the light-controlled attenuator of FIG. 14, as seen generally along the line 15—15 thereof.

FIG. 16 is a sectional view, partially in plan, of the single light source, endless shutter belt and photosensitive cell components of the attenuator illustrated in FIG. 14, as seen generally along the line 16—16 thereof.

FIG. 17 is a plan view of a typical endless belt shutter usable in conjunction with the light-controlled attenuator of FIG. 14.

DESCRIPTION OF THE PREFERRED EMBODIMENTS

Figure 5:
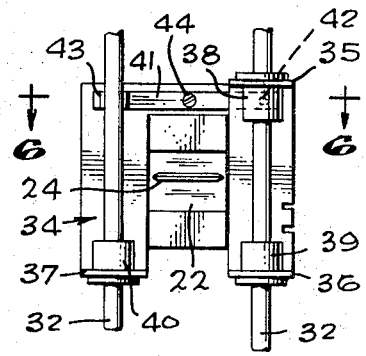
FIG. 5 is a fragmentary front elevational view of the knob and slider mechanism incorporated in the inventive light-controlled attenuator, as seen generally along the line 5—5 of FIG. 3.

Referring now to the drawings, and initially to FIGS. 1 through 6 thereof, there is shown a first embodiment of the inventive light-controlled attenuator. Evident therein is an attenuator, referenced generally at 20, utilizing rotary, disc-shaped optical shutters actuated by a straight line sliding knob, and adapted for recess mounting in an audio console or the like.

Attenuator 20 comprises an escutcheon (FIGS. 1 and 3) which also serves as a support panel for the device. A control knob 22 is adapted for straight line, generally vertical sliding motion within a longitudinal slot 23 along the center of escutcheon 21, under finger control of the operator. As will be apparent from the following description, the setting of control knob 22 determines the effective attenuation of attenuator 20, this setting being indicated by a fiducial line 24 on knob 22 in conjunction with a scale 26 on escutcheon 21.

A generally U-shaped bracket 26 extends behind opening 23 in escutcheon 21. Bracket 26 is fastened to the rear of escutcheon 21 by screws 27 which may threadingly engage flange portions 26' at the top and bottom of bracket 26. Attached to the rear of bracket 26 is a housing 28 containing the optical shutter mechanism for attenuator 20. As set forth hereinbelow, the shutters themselves are attached to a shaft 29 which extends through the sidewall of housing 28 and to which is attached a pulley or drum 30, clearly shown in FIGS. 1 and 3.

Extending vertically between the top and bottom portions 31 of bracket 26, parallel to the edges of slot 23, are a pair of guide rods 32. The spacing between rods 32 is greater than the width of opening 23 so that the rods are hidden from normal view behind escutcheon 21. Rods 32 are attached to bracket portions 31 by appropriate retainers 33 best shown in FIG. 3.

FIGS. 1, 3, 5 and 6 illustrate that knob 22 is attached to a member 34 which itself is adapted to slide longitudinally along rods 32. Member 34 is provided with an upper flange 35 and a lower flange 36 adjacent one vertical edge, and a lower flange 37 adjacent the other vertical edge. Flanges 35, 36 and 37 are apertured, and are provided respectively with bushings 38, 39 and 40. One of the rods 32 extends through bushings 38 and 39, while the other of the rods 32 extends through bushing 40. Preferably, bushings 38, 39 and 40 are fabricated of nylon or the like so as to permit relatively smooth and frictionless linear motion of knob 22 and sliding member 34 along rods 32, without the requirement for lubrication.

Figure 6:
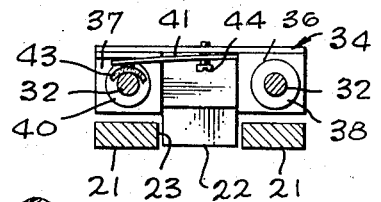
FIG. 6 is a top plan view, partially in section, of the knob and slider mechanism as shown generally along the line 6—6 in FIG. 5.

To control the force required to move knob 22, sliding member 34 is provided with an adjustable friction mechanism. Referring particularly to FIGS. 5 and 6, this mechanism comprises a leaf spring 41 attached to the upper portion of member 34, behind bushing 38, by means of fastener 42. To the other end of leaf spring 41 is attached a curved wiper 43 of felt or similar material. The pressure of leaf spring 41 biases wiper 43 against rod 32. An adjustment screw 44, extending through the center of leaf spring 41 into the rear of member 34, controls the pressure exerted by wiper 43 against rod 32, and hence permits manual adjustment of the force required to move knob 22 along rods 32 to suit the individual likes and desires of the particular operator for manual "feel" in knob operation.

Figure 1:
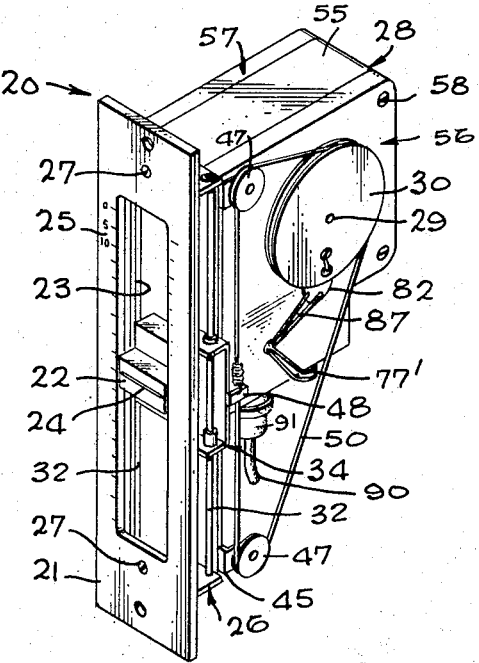
FIG. 1 is a perspective view of a first embodiment of the inventive light-controlled attenuator including disc-shaped optical shutters and a linear slide-type actuating mechanism.

As evident in FIGS. 1 and 3, a pair of flanges 45 extend rearwardly from the top and bottom of one edge of bracket 26. Flanges 45 in turn support the shafts 46 of a pair of pulleys 47. Extending rearwardly from one edge of sliding member 34 is a lug 48 provided with an aperture 49 to which is attached one end of a cable 50. Cable 50 extends around the lower of pulleys 47, around a portion of drum 30, and around upper pulley 47, terminating at the upper end of a tension bias spring 51. The lower end of bias spring 51 also is attached to aperture 49 of lug 48. Thus, it will be clear that linear sliding motion of knob 22 along slot 23 of escutcheon 21 will cause simultaneous linear motion of lug 48, pulling with it cable 50 and causing rotational motion of drum 30 and its shaft 29.

Figure 2:
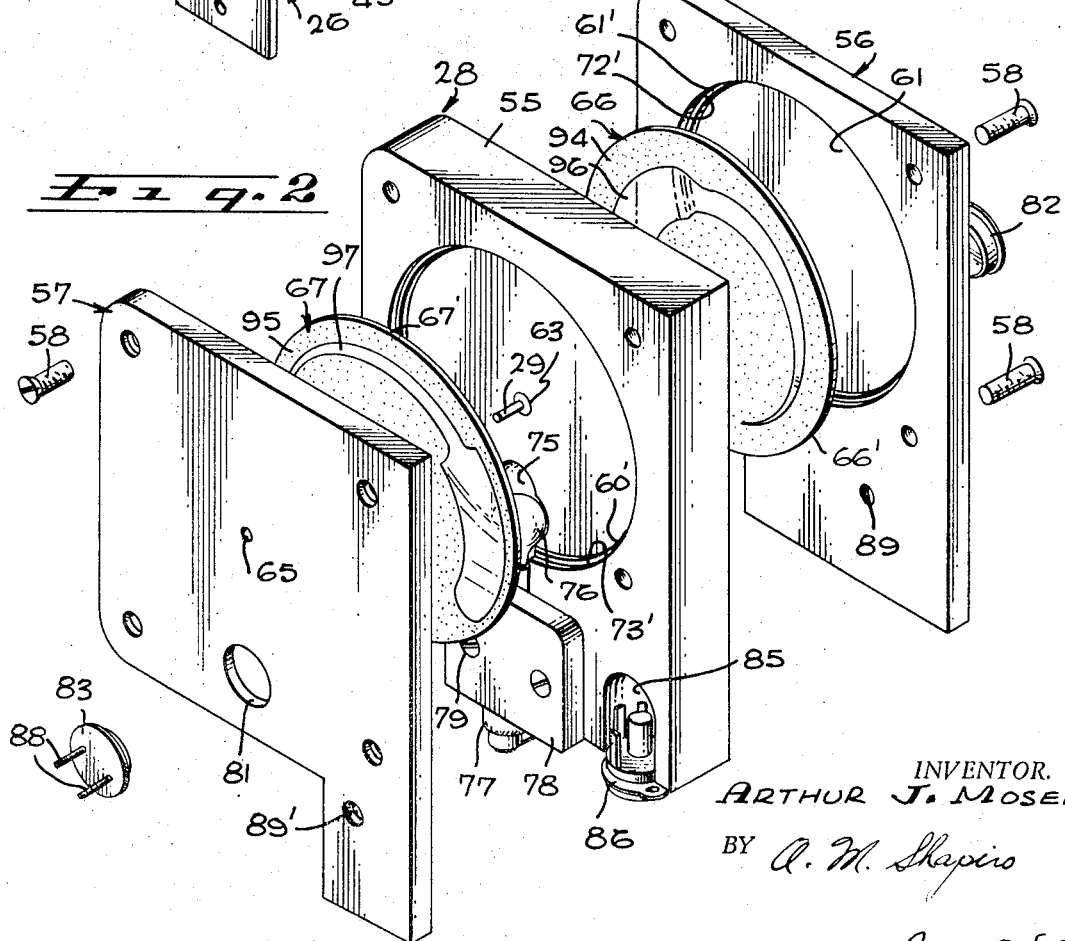
FIG. 2 is an exploded perspective view of the housing utilized in the inventive light-controlled attenuator shown in FIG. 1, illustrating the single light source photosensitive resistance cells and disc-shaped shutters.

The configurations of housing 28 and the attenuator components contained therein most clearly are shown in FIGS. 2 and 4. Referring thereto, note that housing 28 itself comprises a central or interior section 55, and a pair of generally planar sidewalls 56 and 57, all retained in sandwichlike relationship by screw fasteners 58. A pair of circular, coaxial recesses 59 and 60 are situated in the opposite faces of housing central section 55. Another pair of circular recesses 61 and 62 are disposed respectively in the interior faces of housing sidewalls 56 and 57 in opposing relationship to respective central recesses 59 and 60. Recesses 59, 60, 61 and 62 all are aligned coaxially with shaft 29, are of the same diameter, are parallel to each other, and are provided with respective peripheral ledges or annular shoulders 59', 60', 61' and 62' of lesser depth than the recesses themselves.

Shaft 29 itself is rotatably mounted on central section 55 by means of a journal bearing 63 and extends through a pair of clearance holes 64 and 65 in respective sidewalls 56 and 57. As shown in FIGS. 2 and 4, a pair of shutters 66 and 67 are fixedly attached to shaft 29 by appropriate bushings 68 and 69. Bushings 68 and 69 respectively reside in counterbores 70 and 71 located coaxially with holes 64 and 65 in the interior faces of sidewalls 56 and 57.

When housing 28 is assembled as shown in FIG. 4, recesses 59 and 61 together form a lighttight, circular chamber 72 having a peripheral annular groove 72' defined by ledges 59' and 61'. Similarly, recesses 60 and 62 together form a lighttight, circular chamber 73 having a peripheral annular groove 73' defined by ledges 60' and 62'. Shutter 66 resides within chamber 72 and preferably has a diameter such that its peripheral edge 66' is disposed within groove 72'. Similarly, shutter 67 resides within chamber 73 and has a diameter such that its peripheral edge 67' is disposed within groove 73'.

Again referring to FIGS. 2 and 4, the lower edge portion of housing central section 55 is provided with a chamber 75 in which is situated a lamp 76. Chamber 75 is located so that the radial distance from shaft 29 to the filament of lamp 76 is less than the overall radius of each of shutters 66 and 67. Lamp chamber 75 communicates with chambers 72 and 73 so that light from lamp 76 is free to pass through shutters 66 and 67 toward the laterally adjacent portion of housing sidewalls 56 and 57, respectively. Lamp 76 itself is mounted in an appropriate socket 77 which may project downwardly beyond the bottom of housing 28. Socket 77 is supported by a retaining plate 78 attached to central section 56 by fasteners 79 (see FIG. 2). Removal of retaining plate 78 permits access to socket 77 to facilitate replacement of lamp 76.

A pair of circular apertures 80 and 81 are provided through housing sidewalls 56 and 57, respectively. Apertures 80 and 81 are aligned coaxially, their axis passing through the position of the filament of lamp 76. A pair of photosensitive resistance cells 82 and 83 are disposed within respective apertures 80 and 81. As best evident from FIG. 4, light from lamp 76 will pass through shutter 66 to photosensitive resistance cell 82, while light from the other side of lamp 76 will pass through shutter 67 to photosensitive resistance cell 83. Note that a light trap is provided by the disposition of the shutter peripheral edges 66' and 67' within narrow grooves 72' and 73', respectively to prevent light from lamp 76 from reaching cells 82 and 83 around the edges of shutters 66 and 67. A recess 85 (see FIG. 2) in the bottom edge of central section 55 houses a female socket 86 facilitating connection of electrical leads to light-controlled attenuator 20. Referring to FIGS. 1 and 2 in particular, a first pair of leads 87 from photosensitive resistance cell 82 and a second pair of leads 88 from cell 83 extend through respective holes 89 and 89' in housing sidewalls 56 and 57 into recess 85, where the leads are attached to appropriate ones of the pins on socket 86. In addition, a pair of electrical connections 77' from lamp socket 77 pass through hole 89 into recess 85 are and are connected to the pins of socket 86. In this manner, all of the appropriate electrical connections to light-controlled attenuator 20 may be made by means of a single multiconductor cable 90 and appropriate male plug 91, the latter being shown connected in FIG. 1 and disconnected in phantom in FIG. 3.

Shutters 66 and 67 may comprise circular sheets of plastic or like material having respective opaque regions 94 and 95 interrupted only by transparent apertures 96 and 97. As evident in FIGS. 2 and 7, transparent apertures 96 and 97 are generally circular in configuration, variable in width and having a mean radius corresponding to the radial distance between the axis of shaft 29 and the filament of lamp 76. Thus, a portion of aperture 96 is positionable in the light path between lamp 76 and photosensitive resistance cell 82, while a portion of aperture 97 is positionable in the light path between lamp 76 and cell 83.

Typically, the angular extent of apertures 96 and 97 will be greater than 300°. Further, the widths of apertures 96 and 97 disposed in the light path will be a function of angular position on respective shutters 66 and 67. Since the amount of light striking cells 82 and 83 determines the resistance thereof, the widths of the portions of apertures 96 and 97 interposed in the light paths to cells 82 and 83 will respectively determine the resistance of these cells. Since the aperture widths vary with angular location on shutters 66 and 67, it is apparent that rotation of shaft 29 carrying these shutters will cause concomitant change in resistance of cells 82 and 83.

Of course, the aperture pattern of shutters 66 and 67 will depend on the application for which light-controlled attenuator 20 is intended. However, the patterns illustrated in FIGS. 2 and 7 are typical of those which may be encountered in audio level control applications. As viewed therein, the width of aperture 96 appears to decrease gradually in width in the clockwise direction, while aperture 97 appears to decrease in width in the counterclockwise direction. With such a complementary aperture arrangement, clockwise rotation of shaft 29 (as viewed in FIG. 2) will cause an increase in the amount of light striking cell 82 and a decrease in the amount of light striking cell 83, with a concomitant decrease in the resistance of cell 82 and increase in the resistance of cell 83.

Note in FIGS. 2 and 7 that the width of apertures 96 and 97 is not a linear function of angular position on shutters 66 and 67. This is typical of audio applications, wherein the resistance values required bear a nonlinear relationship to the attenuation desired. Moreover, the aperture patterns of shutters 66 and 67 need not be mirror or inverse images of one another. Rather, apertures 96 and 97 may be substantially different in configuration, so that the effective resistance of cell 82 will vary completely differently, and not merely inversely, with the change in resistance of cell 83 as shaft 29 is rotated. Thus, by appropriate shape selection of apertures 96 and 97, a very wide variety of linear or nonlinear resistance relationships may be obtained with the inventive light-controlled attenuator.

It is common in many photosensitive resistance cells, such as those of the cadmium sulfide variety, to have a relatively large photosensitive area. This is typified by the photosensitive grid 82' of cell 82 and the photosensitive grid 83' of cell 83, as shown in FIGS. 8 and 9. Thus, it will be appreciated that, for a particular rotational setting of shaft 29, the width of aperture 96 unblocking the light path to one edge of photosensitive grid 82' of cell 82 may be considerably different from the width of the aperture portion unblocking the light path to the opposite edge of grid 82'. The resistance of cell 82 is a function of the total light incident thereon. As a result, the precision with which the resistance of cell 82 may be controlled as a function of rotation of shaft 29 is affected by the width of photosensitive grid 82' when the interposed portion of the aperture is extremely narrow. To obtain better resolution, an auxiliary fixed filter or mask 100 such as that illustrated in FIGS. 4 and 8 may be disposed over either or both of cells 82 and 83. In FIG. 4, such a mask 100 is shown only over cell 83, but it is to be understood that a like mask also may be used over cell 82.

Referring to FIG. 8, it may be seen that mask 100 comprises a generally triangular sheet of plastic or like material which is transparent over most of its surface. Mask 100 is provided with a pair of arcuate, fingerlike opaque regions 101 and 102 having a common mean radius of curvature corresponding to the mean radius between the shutter aperture 97 and the axis 29' or shaft 29. It should be noted that the illustration of mask 100 in FIG. 8 is slightly diagrammatic rather than pictorial for convenience and clarity of description in that mask 100 has its illustrated overall shape only during assembly so that the location of opaque regions 101 and 102 may be fixed precisely relative to shaft axis 29' during securement of mask 100, after which mask 100 is cut along a chord for removal of the radially inner portion for clearance relative to bushing 69 (FIG. 4). Typically, the width of opaque regions 101 and 102 is on the order of one-eighth inch. Opaque regions 101 and 102 are separated from each other by a transparent aperture region 103 situated at the center of the photosensitive grid 83' of cell 83. The spacing between opaque section 101 and 102 typically is on the order of only 0.005 inch to provide the extremely small auxiliary aperture desired for a highly restricted light path during interposition of the narrow portion of the shutter aperture 97.

The function of mask 100 is illustrated in FIGS. 10 and 11 in which relative proportions are somewhat exaggerated for clarity. Referring first to FIG. 10, cell 83 is shown in phantom as viewed through the combination of shutter 67 and mask 100 as though from the light source. Note that the opaque region 95 of shutter 67 prevents most of the light from lamp 76 from striking cell 83. Moreover, not all of the light passing through aperture 97 reaches cell 83, most of this light being blocked by opaque fingers 101 and 102 on mask 100 when the narrow portion of aperture 97 is interposed as illustrated. Thus, the only light incident on cell 83 is that which passes through the portion 97a of movable aperture 97 aligned with the fixed auxiliary aperture 103 between fingers 101 and 102. Note that auxiliary aperture 103 is defined by the opposing ends 101' and 102' of respective fingers 101 and 102 and, as illustrated, preferably comprise straight parallel portions for sharpness and accuracy of resolution. As further illustrated, the corners of ends 101' and 102' are radiused preferably to assure smoothness of transition when the light path becomes enlarged due to rotation of the shutter to a wider aperture portion.

In FIG. 10, it should be noted that, if it were not for the presence of the auxiliary mask 100 and its small restricted aperture 103, the light path to cell 83 through the primary aperture 97 would be much greater in the shutter position shown. Accordingly, the use of the mask 100 and its restricted auxiliary aperture 103 permits the use of a wider pattern for aperture 97 for a given amount of light transmission than would be the case without the mask 100. Thus, greater precision in light transmission control is attained since the proportionate effect of any errors in aperture pattern width are greatly reduced.

In FIG. 11, shutter 67 has been rotated via shaft 29 so that a different portion 97b of aperture 97 is aligned with the fixed aperture region 103 between opaque fingers 101 and 102 on mask 100. In the example of FIG. 11, the width of aperture 97 adjacent the right-hand side of photosensitive resistance cell 83 is somewhat narrower than the width of aperture 97 adjacent the left-hand edge of cell 83. Were it not for the effect of opaque fingers 101 and 102, blocking all light to cell 83 except that transmitted through aperture portion 97b aligned with fixed aperture 103, the effective resistance of cell 83 would not be determined only by the width of aperture portion 97b situated at the center of the cell, but would be determined by the amount of light passing through a much larger region of shutter 97, thus necessitating a narrower pattern width for aperture 97 and a concomitant decrease in attenuator precision.

Still referring to FIG. 11, it may be seen that in the regions 97c where aperture 97 is broader than the width of mask fingers 101 and 102, the operation of mask 100 is of reduced significance. When region 97c becomes interposed in front of cell 83 by virtue of continued shutter rotation, the amount of light striking the cell is very great and, thus, a change in width of the aperture represents a much smaller percentage change in effective resistance so that is is not critical that the light striking the cell be limited to an aperture portion of very small angular extent as in the case of the narrow width aperture portion. It will be noted that, in applications where the aperture pattern does not include a requirement for extremely narrow aperture portions for finely and accurately restricting the light path and light levels, the auxiliary mask need not be employed.

Shutters 66 and 67 may be fabricated most readily by photographic techniques. Thus, the shutters may comprise a mylar or other transparent plastic sheet coated with a photographic emulsion which is exposed through a mask containing the desired aperture pattern. Where light strikes the emulsion, subsequent developing will cause the surface to become opaque, defining opaque regions 94 and 95. Those regions where no light strikes the emulsion through the mask will, upon subsequent developing, form apertures 96 and 97.

By photographically fabricating shutters 66 and 67, an additional feature can be realized. Typically, individual photosensitive resistance cells may vary somewhat in minimum resistance when fully illuminated from the same source. When manufacturing a number of attenuators designed to have the same variable resistance characteristics, it is desirable that the resistances of all cells used as cell 82 (or, similarly, as cell 83) be identical when subjected to the same maximum illumination level from lamp 76. This is desirable to insure that the cells will produce the desired calculated resistance at any shutter setting at which less than the maximum light level reaches the cell.

To compensate for differences in minimum resistance of two photosensitive cells, the following technique may be used. First, both cells are illuminated at the same maximum light level and the resistance of the two cells compared. If the resistances are different, a variable density optical filter is inserted in the light path to the one having the lower resistance, and this filter is adjusted until the resistances from the two cells are identical. The filter density required to achieve this equal resistance condition is then measured, thereby determining the amount of constant filtering required in the light path of that cell.

The desired filtering could be achieved by interposing a filter of the measured density in the light path to the cell. However, the shutter aperture itself may serve as this filter. Thus, suppose it is necessary to insert a filter of given density in the light path to cell 82. In this instance, when shutter 66 is fabricated, the entire photographic emulsion-coated sheet first is exposed to a light level sufficient to achieve an overall level of opacity equal to the required filter density. Subsequently, the sheet is reexposed through the aperture defining mask. In the areas where light now strikes the emulsion, completely opaque region 94 again is produced. However, the regions in which exposure light is blocked by the mask now become apertures which are not fully transparent, but which have a partial opacity equal to the required filter density.

Note that in regions where apertures 96 and 97 are of narrow width, exact photographic definition of the aperture edges is necessary to assure accuracy of the instrument. Thus, fuzzy or blurred aperture edges will cause the actual resistances of cells 82 and 83 to differ somewhat from the values calculated when designing the aperture masks. While very high definition, blur-free edges can be achieved photographically, the required high resolution photographic processing may be excessively expensive. Under such circumstances, it may be more desirable to utilize a shutter the light transmission through which is controlled not by aperture size but by optical density or transmissivity. Thus, shutters 66 and 67 each may comprise a plastic sheet containing a density pattern varying as a function of angular position. In angular regions where less light transmission to cell 82 or 83 is desired, the disc would have a dark or dense appearance. In angular regions where more light transmission was required, the optical density would be less. Such variable density shutters can be fabricated photographically at low cost and without the requirement of high image resolution necessary to produce apertured shutters. These variable density filters can be substituted in light-controlled attenuator 20 directly in place of the apertured shutters 66 and 67 described hereinabove.

The operation of light-controlled attenuator 20 now should be apparent. In particular, an appropriate voltage is provided from a conventional source to lamp 76. Light from one side of lamp 76 illuminates cell 82 through shutter 66. The resistance of cell 82 is determined by the width of the portion of aperture 96 aligned in the light path to cell 82. Similarly, light from the other side of lamp 76 illuminates cell 83 through shutter 67; the resistance of cell 83 is determined by the width of the portion of aperture 97 interposed in the light path.

By moving knob 22 longitudinally of escutcheon 21, cable 50 cooperates with drum 30 to cause rotation of shaft 29. Shaft 29 in turn causes rotation of shutters 66 and 67, interposing different portions of apertures 96 and 97 in the light paths to cells 82 and 83, and causing concomitant changes in resistance of these cells. The relationship between the linear position of knob 22, as indicated by scale 25, and the resistance of cells 82 and 83 is determined by the aperture (or density) pattern of shutters 66 and 67. Extremely precise resistance changes are attained throughout shutter rotation, such precision at cell 83 being aided by the auxiliary aperture 103 being disposed transversely to the direction of movement of the primary aperture 97 for narrowly restricting the light path at areas where low light transmission is required.

The inventive light-controlled attenuator finds wide applicability in electrical circuits where extremely low noise, velvet smooth control, and a wide range of attenuation are important. Typical of such applications is level control in audio program circuits. For level or volume control, it is desirable to maintain a constant input and output impedance while providing variable attenuation to the signal. Such constant impedance eliminates the program distortion which would result should the terminal impedance change as the amount of attenuation was changed.

The electrical schematic diagram of FIG. 12 shows a bridged T level control circuit in which the inventive light-controlled attenuator can be used advantageously. In this circuit, variable resistor 105 corresponds to photosensitive resistance cell 82, while variable resistor 106 corresponds to photosensitive resistance cell 83. Fixed resistors 107 and 108 complete the otherwise conventional bridged T circuit. As illustrated, input signal from a source 109 is connected across input terminals 110. The output signal is obtained across terminals 111 and is herein represented by a generator 112 which may be thought of as providing the input signal to the following stage. The arrows on resistors 105 and 106 are drawn in opposite directions to reflect the fact that these resistances vary generally inversely in the particular arrangement illustrated.

By appropriate selection of the aperture 96 and 97 patterns, the circuit of FIG. 12 will perform the function of attenuating the input signal from source 109 by an amount determined by the setting of sliding knob 22. The circuit will maintain constant input and output impedances over substantially the entire attenuation range.

Of course, the circuit of FIG. 12 is by no means the only type of circuit in which the inventive light-controlled attenuator may be used. Thus, the attenuator may be incorporated in other types of circuits such as a potentiometer, an L, balanced H, balanced L or like circuits well known to those skilled in the art and commonly used for audio or other applications.

A knob-controlled embodiment of the inventive light-controlled attenuator is shown in FIG. 13. Referring thereto, there is depicted an attenuator 115 having a housing 116. Housing 116 and all of the attenuator components contained therein correspond identically to housing 28 and its constituent components all as described herein above. In the embodiment of FIG. 13, the portion of the shaft projecting exteriorly of housing 116 extends through a fragmentarily shown panel 117 and terminates in a knob 118. Knob 118 includes a pointer 118' which, in conjunction with a scale 119, indicates the extent of attenuation attained by the corresponding rotational position of the shutters employed in the light-controlled attenuator.

The operation and application of light-controlled attenuator 115 of FIG. 13 is identical to that of light-controlled attenuator 20 described hereinabove in conjunction with FIGS. 1 through 12. However, it is readily apparent that the number of knob-controlled attenuators 115 which can be mounted on an audio control panel is far less than the number of slider-type attenuators 20 (FIGS. 1—4) which can be mounted in the same area because of the orientation of the housing behind the panel. This is of particular importance in recording and other applications where it is necessary to employ a large number of attenuators all within arms reach of a single audio engineer.

FIGS. 14 through 17 show yet another embodiment of the present invention wherein a pair of shutters both are fabricated on the same endless belt. In this embodiment, an attenuator 120 comprises an escutcheon panel 21, a knob 22, a bracket 26, a pair of rods 32, a sliding member 34, a pair of pulleys 47 and a cable 50, all corresponding identically to the like numbered components in the embodiment of FIGS. 1 through 6.

Referring still to FIGS. 14 through 17, light-controlled attenuator 120 is provided with a housing 121 attached to bracket 26 by means of a pair of support members 122. Housing 121 is fabricated in three sections, a central section 123 sandwiched between sidewalls 124 and 125. A spaced parallel pair of elongate lighttight chambers 126 and 127 are defined within housing 121. Chambers 126 and 127 are substantially parallel to escutcheon 21, and terminate at their upper and lower ends in respective cylindrical chambers 128 and 129. Disposed respectively within chambers 128 and 129 are a pair of cylindrical rollers 130 and 131 supported by respective shafts 132 and 133. Shaft 133 projects exteriorly of housing 121 and is connected to a drum 134. Cable 50 extends about a portion of drum 134 so that sliding motion of knob 22 imparts rotational motion to drum 134, shaft 133 and cylindrical roller 131.

The optical shutters for light-controlled attenuator 120 both are contained on a single endless belt 135 which extends between rollers 130 and 131 within chambers 126 and 127. Shutter belt 135 includes an opaque region 136 interrupted only by a first transparent aperture 137 extending linearly along a portion of belt 135 and a second transparent aperture 138 (shown in phantom in FIG. 17) extending linearly along the portion of belt 135 hidden from view in FIG. 17, "diagonally" opposite aperture 137.

As shown in FIGS. 14 and 16, housing central section 123 contains a central chamber 139 which communicates with chambers 126 and 127. A lamp 140 is situated within chamber 139, supported by a socket 141 which is appropriately recess-mounted in central section 123. A pair of photosensitive resistance cells 142 and 143 are mounted in circular apertures 144 and 145 through sidewalls 124 and 125. Apertures 144 and 145 are coaxial, their common axis extending through the position of the filament of lamp 140. Electrical connections to lamp 140 and cells 142 and 143 are facilitated by means of a connector 146 and appropriate multiconductor cable 147. By making belt 135 and chambers 126 and 127 wider than chamber 139 (see FIG. 16), light from lamp 140 is prevented from reaching cells 142 and 143 around the edges of belt 135.

Operation of light-controlled attenuator 120 corresponds closely to that of attenuator 20 described hereinabove. In particular, an appropriate voltage is supplied to lamp 140 from a conventional source. Light from lamp 140 reaches cell 142 through a portion of aperture 137 in shutter belt 135 (see FIG. 16), the width of this aperture portion determining the effective resistance of cell 142. Similarly, light from lamp 140 reaches cell 143 via a portion of aperture 138 on the opposite side of shutter belt 135, the width of this portion determining the effective resistance of cell 143.

When knob 22 is moved upward, as viewed in FIG. 14, rotational motion is imparted to cylindrical roller 131. This causes the section of shutter belt 135 containing aperture 137 to move upward, and causes the section of shutter belt 135 containing aperture 138 to move downward. As a result, different portions of apertures 137 and 138 are interposed respectively in the light paths from lamp 140 to cells 142 and 143, causing concomitant changes in resistance of these cells.

As discussed hereinabove, the shapes of apertures 137 and 138 are appropriately selected to achieve the desired resistance of cells 142 and 143 as a function of position of knob 22. Moreover, as an alternative to using apertures, shutter belt 135 may contain a pair of optical density patterns which vary as a function of linear position along the belt.

I claim:

1. A light controlled variable resistance device comprising:
   a housing means;
   a single light source fixedly mounted on said housing means interiorly thereof;
   a plurality of photosensitive resistance cells fixedly mounted on said housing means and facing said light source;
   a corresponding plurality of individual light paths from said light source to said cells within said housing means;
   a corresponding plurality of disc-shaped light shutters movably mounted on said housing means, each of said shutters having a respective predetermined spatial pattern of light transmissivity with a portion thereof interposed in a respective one of said light paths, said spatial pattern comprising a substantially circular elongate aperture varying in said light transmissivity along its length via one of transparent width variations and optical density variations, the remainder of the shutter being opaque; and
   selectively operable means coupled to said shutters for simultaneously moving all of said shutters for interposing differing pattern portions thereof in said light paths, said selectively operable means comprising:
   a shaft extending through said housing;
   said shutters being fixedly mounted to said shaft so as to be simultaneously rotatable therewith; and
   means for rotating said shaft.

2. A variable resistance device as defined in claim 1 wherein the mean radius of each of said apertures is substantially equal to the radial distance from the axis of said shaft to said light source.

3. A variable resistance device as defined in claim 2 wherein said means for rotating comprises a manually operable knob attached to said shaft.

4. A variable resistance device as defined in claim 2 wherein said means for rotating comprises:
   a knob manually operable adapted for linear sliding motion; and
   means operatively connecting said knob and said shaft for imparting rotational motion to said shaft in response to linear motion of said knob.

5. A light-controlled variable resistance device comprising:
   housing means;
   a single light source fixedly mounted on said housing means interiorly thereof;
   a plurality of photosensitive resistance cells fixedly mounted on said housing means and facing said light source;
   a corresponding plurality of individual light paths from said light source to said cells within said housing means;
   a corresponding plurality of light shutters movably mounted on said housing means, each of said shutters having a respective predetermined spatial pattern of light transmissivity with a portion thereof interposed in a respective one of said light paths, said spatial pattern comprising an elongate aperture varying in said light transmissivity along its length via one of transparent width variations and optical density variations, the remainder of the shutter being opaque, said shutters comprising opposing sections of an endless belt; and
   selectively operable means coupled to said belt for simultaneously moving all of said shutters for interposing differing pattern portions thereof in said light paths.

6. A variable resistance device as defined in claim 5 wherein said light source is disposed between said opposing sections.

7. A variable resistance device as defined in claim 6 wherein said selectively operable means comprises:
   a pair of spaced parallel cylinders located within said housing means, each having a shaft rotatably mounted on said housing means;
   said belt disposed about and extending between said cylinders;
   said shaft of one of said cylinders projecting externally of said housing means; and
   means for rotating said shaft.

8. A variable resistance device as defined in claim 7 wherein said means for rotating comprises a knob.

9. A variable resistance device as defined in claim 7 wherein said means for rotating comprises;
   a manually operable knob adapted for linear sliding motion; and
   means operatively connecting said knob and said shaft for imparting rotational motion to said shaft in response to linear motion of said knob.

10. A light-controlled variable resistance device comprising:
    housing means;
    a single light source fixedly mounted on said housing means interiorly thereof;
    a plurality of photosensitive resistance cells fixedly mounted on said housing means and facing said light sources;
    a corresponding plurality of individual light paths from said light source to said cells within said housing means;
    a corresponding plurality of light shutters movably mounted on said housing means, each of said shutters having a respective predetermined spatial pattern of light transmissivity with a portion thereof interposed in a respective one of said light paths, said spatial pattern comprising an elongate aperture varying in said light transmissivity along its length via one of transparent width variations and optical density variations, the remainder of the shutter being opaque;
    selectively operable means coupled to said shutters for simultaneously moving all of said shutters for interposing differing pattern portions thereof in said light paths; and
    a mask disposed in the light path to at least one of said cells, said mask being transparent except for a pair of opposed, spaced opaque fingers defining a narrow auxiliary aperture therebetween and centered over the light-sensitive area of said one cell.

11. A variable resistance device as defined in claim 10 wherein the width of said auxiliary aperture is on the order of 0.005 inch.

12. A light-controlled variable resistance device comprising in combination:
    a housing having a central section sandwiched between a pair of generally planar sidewalls;
    a rotatable shaft extending through said housing;
    a pair of disc-shaped hollow chambers within said housing, said chambers being coaxial with said shaft;
    a lamp disposed in said central section in a hollow recess eccentrically communicating with said chambers;
    a pair of disc-shaped shutters disposed respectively in said chambers, said shutters being coaxial with and fixedly attached to said shaft so as to rotate simultaneously therewith;
    a pair of photosensitive resistance cells, each cell being disposed in a respective one of said sidewalls facing said lamp through an interposed portion of a respective one of said shutters, said shutters each containing a spatial pattern determining the amount of light transmitted through said interposed portions; and
    means for rotating said shaft, said rotation simultaneously changing the portions of said shutters interposed between said lamp and the respective said cells.

13. A light-controlled variable resistance device as defined in claim 12 wherein said spatial pattern comprises a generally circular, elongate, transparent aperture through an otherwise opaque shutter, the means radius of said aperture corresponding to the radial distance between the axis of said shaft and the filament of said lamp the radial width of said aperture being a function of angular position on the shutter.

14. A light-controlled variable resistance device as defined in claim 13 further comb comprising a mask disposed between one of said shutters and the corresponding cell, said mask being transparent except for a pair of opposed, spaced arcuate opaque fingers having a common mean radius substantially equal to the mean radius of said aperture and defining a narrow auxiliary aperture therebetween and centered over the light-sensitive area of said corresponding cell.

15. A light-controlled variable resistance device as defined in claim 14 wherein the width of said auxiliary aperture is on the order of 0.005 inch.

16. A light-controlled variable resistance device as defined in claim 13 wherein each of said chambers includes a peripheral annular recess, the peripheral edges of said disc-shaped shutters extending within respective said annular recesses.

17. A light-controlled variable resistance device comprising in combination:
    a housing having a central section sandwiched between a pair of generally planar sidewalls;
    a pair of planar, spaced parallel, elongate chambers within said housing at the interfaces between said central section and said sidewalls;
    a pair of cylindrical chambers within said central section at respective ends of, and communicating with, said elongate chambers;
    a pair of rotatable cylinders respectively disposed within said cylindrical chambers, the shaft of one of said cylinders projecting through said housing;
    a lamp disposed in said central section in a hollow recess communicating with said elongate chambers and situated about midway between said cylindrical chambers;
    an endless belt disposed within said chambers and around said cylinders, opposing regions of said belt comprising a pair of optical shutters;
    a pair of photosensitive resistance cells, each cell being disposed in a respective one of said sidewalls facing said lamp through respective interposed shutter portions of said belt, said shutters each containing a spatial pattern determining the amount of light transmitted by said interposed portions; and
    means for rotating said shaft, said rotation simultaneously changing the portions of said shutters interposed between said lamp and the respective cells.

18. A light-controlled variable resistance device as defined in claim 17 wherein each of said spatial patterns comprises an elongate, transparent aperture in an otherwise opaque shutter, the aperture being disposed longitudinally of said belt, the width of said aperture being a function of position along said belt.